United States Patent [19]
Carter

[11] 3,942,026
[45] Mar. 2, 1976

[54] WIND TURBINE WITH GOVERNOR
[76] Inventor: Frank H. Carter, 428 North St., Taft, Calif. 93268
[22] Filed: June 11, 1974
[21] Appl. No.: 478,773

[52] U.S. Cl. .............................. 290/55; 416/198 R
[51] Int. Cl.² ....................... F03D 9/00; H02P 9/04
[58] Field of Search .......... 416/198; 290/55, 44, 54, 290/43

[56] References Cited
UNITED STATES PATENTS

| | | | |
|---|---|---|---|
| 1,015,505 | 1/1912 | Noon et al. | 416/198 |
| 1,266,518 | 5/1918 | Mulrony | 416/124 |
| 1,345,022 | 6/1920 | Oliver | 290/55 |
| 1,498,978 | 6/1924 | Muntz | 416/585 |
| 1,504,259 | 8/1924 | Miller | 416/194 |
| 1,633,460 | 6/1927 | Silvestring | 290/55 |
| 2,563,279 | 8/1951 | Rushing | 290/55 |

Primary Examiner—Robert S. Macon
Attorney, Agent, or Firm—Clarence A. O'Brien; Harvey B. Jacobson

[57] ABSTRACT

A wind driven turbine having a plurality of wind wheels mounted on a single drive shaft supported rotatably on a turntable at the upper end of a supporting framework with a plurality of wind wheels being mounted on opposite ends of the single horizontal shaft. The horizontal shaft is drivingly connected to a vertical shaft which drives a generator assembly at the lower end of the supporting framework. A wind vane assembly is connected to the turntable and a governor assembly is drivingly connected to the horizontal shaft for controlling the rotational speed of the wind wheels and horizontal shaft.

6 Claims, 5 Drawing Figures

Fig. 1

WIND TURBINE WITH GOVERNOR

BACKGROUND OF THE INVENTION

1. Field of the Invention

The present invention generally relates to a wind driven turbine assembly for driving a generator or generators in a manner to produce electrical energy in response to rotation of the wind turbine and more particularly to such an arrangement incorporating a novel turntable assembly for supporting the wind turbine assembly from a supporting framework or derrick and a governor for controlling rotational speed of the multiple wind wheels.

2. Description of the Prior Art

The following U.S. patents relate generally to this field of endeavor.

| | |
|---|---|
| 554,138 | Feb. 4, 1896 |
| 1,816,632 | July 28, 1931 |
| 2,179,885 | Nov. 14, 1939 |
| 2,273,084 | Feb. 17, 1942 |
| 2,539,862 | Jan. 30, 1951 |
| 2,655,604 | Oct. 13, 1953 |

SUMMARY OF THE INVENTION

An object of the present invention is to provide a wind driven turbine assembly including a plurality of axial flow wind wheels mounted at opposite ends of a horizontally disposed shaft supported in elevated relationship to the ground surface by a suitable framework or derrick by a turntable assembly which enables the axis of rotation of the wind wheels to be maintained in substantially parallel relation to the direction of movement of air for more efficiently driving the wind wheels.

Another object of the invention is to provide a wind turbine assembly including a single vertical drive shaft drivingly connected to a generator assembly and a governor assembly for controlling the rotational speed of the drive shaft by connecting additional generators to the drive shaft for increasing the load thereon.

A further object of the invention is to provide a wind turbine assembly in accordance with the preceding objects in which the wind turbine assembly is supported on a turntable rotatably connected to a supporting platform at the upper end of a derrick for rotation about a vertical axis coinciding with the vertical drive shaft together with a wind vane associated with the turntable for maintaining proper orientation of the wind wheels in relation to the wind.

Another important object of the invention is to provide a wind turbine assembly which is relatively simple in construction, capable of variation in size and output, effective in controlling the output speed of the drive shaft and thus the rotational speed of the wind wheels and relatively long lasting and maintenance free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a vertical sectional view taken substantially upon a plane passing along section line 4—4 of FIG. 3 illustrating the construction of one of the wind wheels.

FIG. 5 is a fragmental, sectional view, on an enlarged scale, taken substantially upon a plane passing along section line 5—5 of FIG. 2 illustrating further structural details of the turntable structure.

DESCRIPTION OF THE PREFERRED EMBODIMENT

Figure 1:
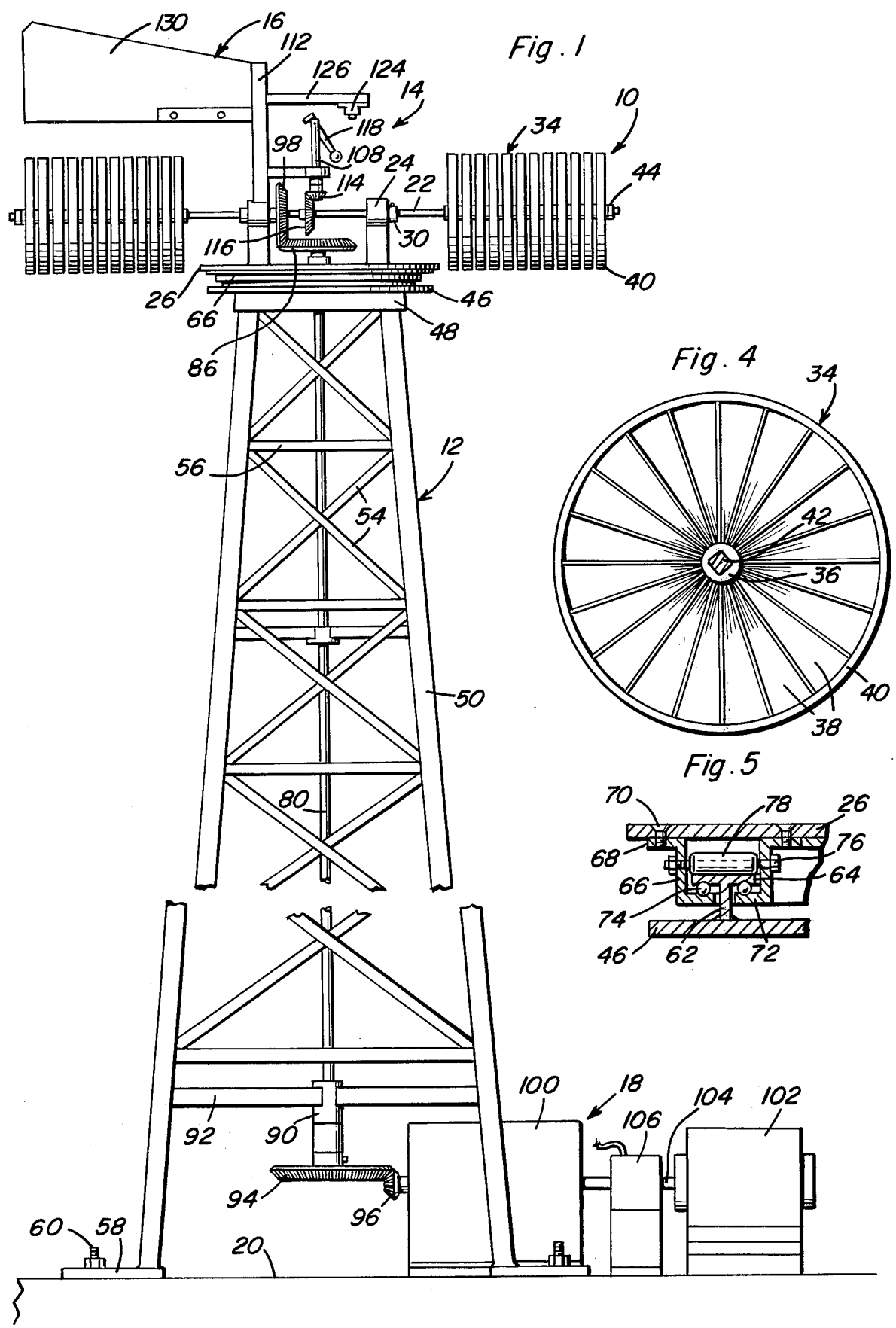
FIG. 1 is a side elevational view of the wind turbine of the present invention with a portion of the supporting structure broken away indicating an indeterminate height for the device.
Figure 2:
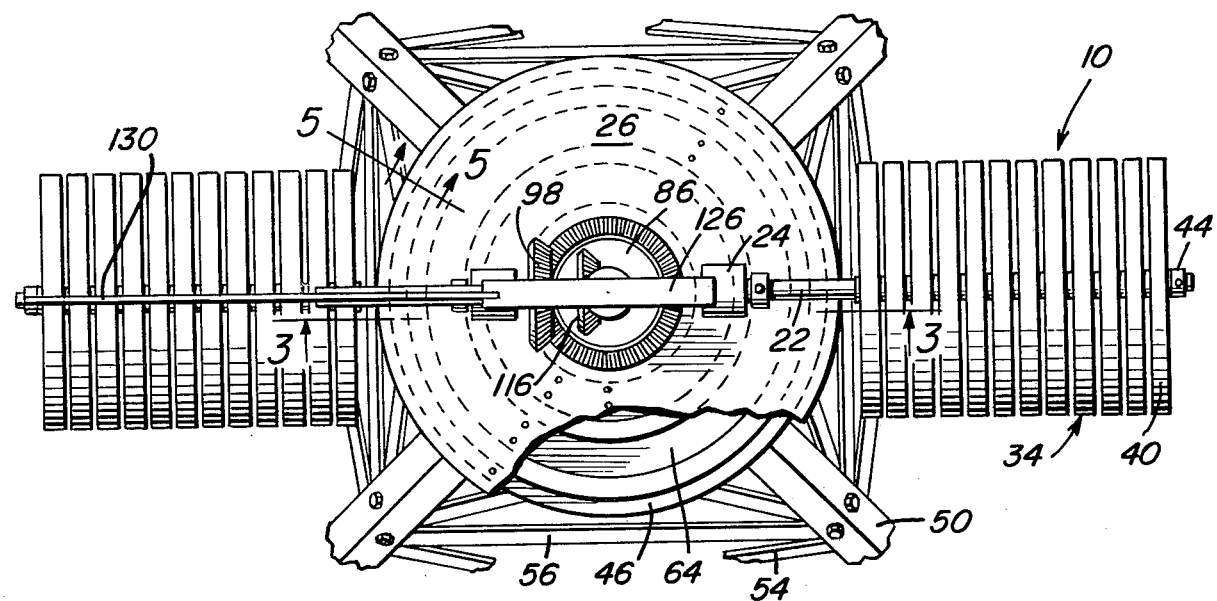
FIG. 2 is a top plan view of the construction of FIG. 1.

Referring now specifically to the drawings, the wind turbine assembly 10 of the present invention is mounted in elevated relation to the ground surface of the like by a supporting framework or derrick generally designated by numeral 12 and includes a governor assembly 14, a wind vane assembly 16 with the turbine assembly driving a generator assembly 18 located at ground level or on a supporting platform 20 or the like.

The wind turbine assembly 10 includes a single, rigid, horizontally disposed shaft 22 rotatably supported by a pair of pillow block bearing structures 24 that are rigid with and extend upwardly from diametrically opposed portions of a generally circular turntable 26. The pillow block bearings 24 include bearing assemblies 28 which may be in the form of ball bearings, roller bearings, bushings or the like and also are in the form of thrust bearings with one of the bearing assemblies 28 being locked to the shaft 22 by a collar 30 rigid with the inner race thereof and secured to the shaft by a setscrew 32 or the like thereby preventing longitudinal movement of the shaft 22 but enabling disassembly of the shaft 22 in relation to the pillow block bearings 20 when desired.

Figure 3:
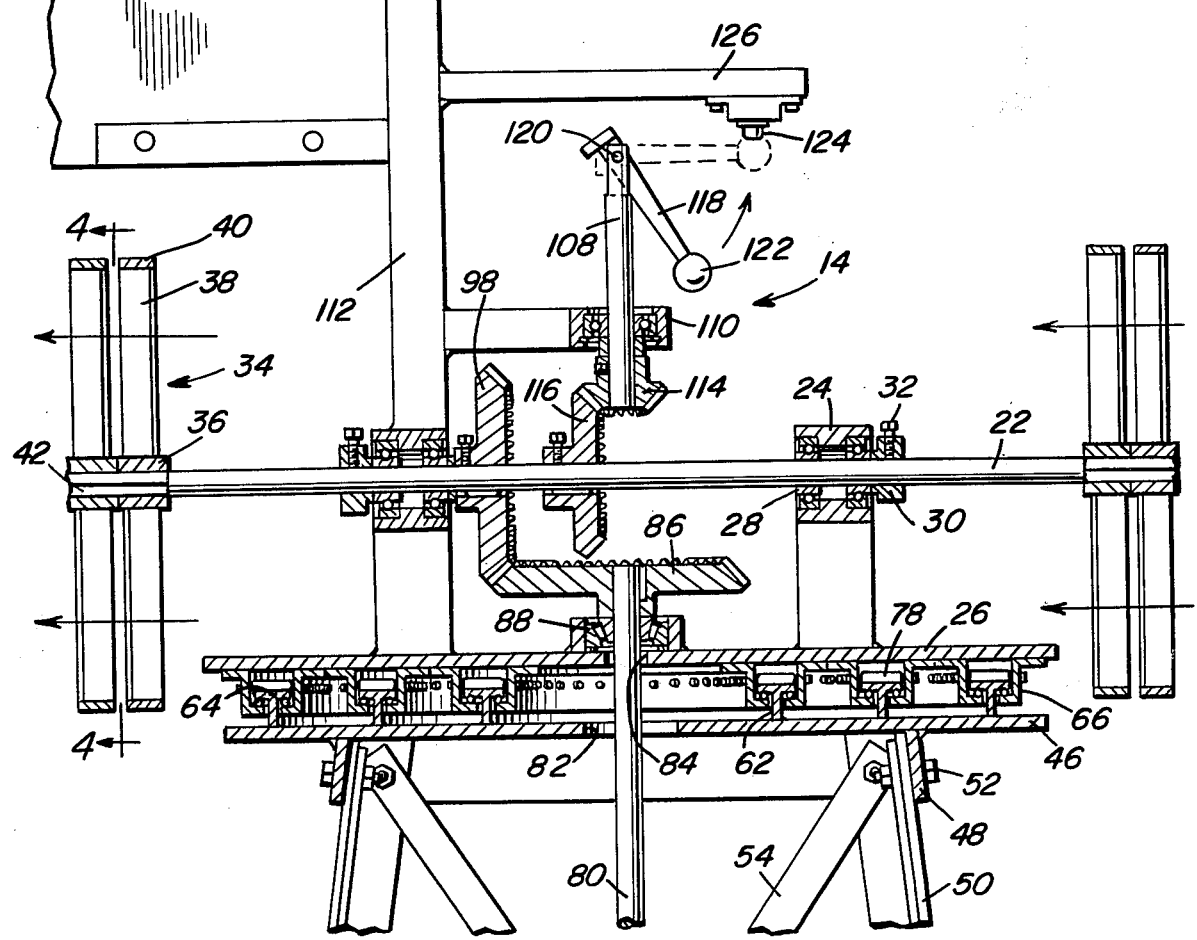
FIG. 3 is a vertical, sectional view, on an enlarged scale, taken substantially upon a plane passing along section line 3—3 of FIG. 2 illustrating the structural details of the invention.

The ends of the shaft 22 support a plurality of wind wheels each generally designated by the numeral 34 with each wind wheel 34 including a central hub 36, a plurality of radially extending blades 38 and a peripheral wheel or rim 40 which interconnects the outer ends of the blades 38 for maintaining them in rigid relation. The blades 38 extend axially of the hub 36 and rim 40 in an inclined manner as illustrated in FIGS. 3 and 4 so that when wind passes through the blades 38 as indicated by the arrows in FIG. 3, the wind wheels 34 will cause rotation of the shaft 22. The wind wheels 34 are rigidly affixed to the shaft 22 in a detachable manner such as by providing polygonal end portions 42 on the shaft 22 with the interior of the hub being correspondingly shaped as illustrated in FIG. 4 thereby preventing relative rotation of the wind wheels 34 on the shaft 22. A removable collar 44 is provided on the outer ends of the shaft 22 for maintaining a plurality of wind wheels 34 on each end of the shaft 22 with the number of wind wheels being varied but the number of wind wheels on each end portion of the shaft 22 should be equal in number. Thus, wind passing from right to left as indicated in FIG. 3 will cause rotation of the shaft 22 with the pillow block bearings 24 supporting the shaft 22 in spaced relation above the turntable 26.

The turntable 26 is supported from a horizontally disposed support plate 46 rigidly affixed to the upper end of the derrick 12 by virtue of a depending flange 48 secured to the upper ends of corner angle iron legs 50 by suitable fastening bolts 52 or the like. The corner legs 50 are braced and rigidly interconnected by diagonal braces 54 and also peripheral braces 56 thus providing a rigid support structure. The lower ends of the corner legs 50 are provided with horizontal flanges or feet 58 secured to the supporting surface 20 by holddown bolts 60 or the like.

For connecting the rotatable turntable 26 with the stationary plate 46, the stationary plate 46 is provided with a plurality of circumferentially extending upstanding flanges 62 which are concentrically spaced from each other and rigidly affixed to the upper surface of the supporting plate 46 as by welding or the like as illustrated in FIG. 5. The uppper end of each flange 62 is provided with a rigid horizontal flange 64 so that the flanges 62 and 64, in effect, form a T-shaped annular member rigid with the plate 46 with there being three annular members oriented in concentrically spaced relation as illustrated in FIG. 3.

For each of the flanges 64, the turntable 26 is provided with a pair of Z-shaped annular members 66 having an upper flange 68 secured to the undersurface of the turntable 26 by fasteners 70. The lower flange 72 of each member 66 extends into underlying relation to the horizontal flange 64 as illustrated in FIG. 6 with bearing elements such as ball bearings 74 interposed between the flanges 72 and the undersurface of the flange 64. The vertical flange of the Z-shaped member 66 includes a plurality of axle bolts or pins 76 therethrough which rotatably support a roller 78 which engages the upper surface of the flange 64 thus rotatably supporting and captively retaining the turntable 26 on the support plate 46 so that rotation of the turntable 26 will be about the center of the turntable 26 and the plate 46 with the rollers 78 and bearing elements 74 enabling free swivelling movement of the turntable with these components being suitably lubricated as deemed necessary.

Extending vertically of the supporting framework or derrick is a vertical drive shaft 80 which extends up through an aperture 82 in the support plate 46 and an aperture 84 in the turntable 26 with the upper end of the drive shaft 80 having a horizontally disposed bevel gear 86 rigidly secured thereto. The shaft 80 is journaled from the turntable 26 by a thrust bearing assembly 88 at its upper end and the lower end of the shaft 80 is journalled from a bearing assembly 90 supported by brace members 92 extending to the framework 12. Also, the lower end of the shaft 80 is provided with a bevel gear 94 that is in driving engagement with a correspondingly beveled gear 96 for driving the generator assembly 18. The upper bevel gear 86 on the vertical drive shaft 80 is in meshing engagement with a beveled drive gear 98 that is rigidly secured to the horizontal drive shaft 22 as illustrated in FIG. 3. Thus, as the wind wheels rotate the shaft 22, the bevel gear 98 will drive the bevel gear 88 and thus drive the shaft 80 and the generator assembly 18.

The generator assembly 18 includes a first generator 100 which has a shaft connected to the gear 96 and a second generator 102 having a common shaft 104 connected to the same shaft as the first generator 100 through a suitable electric type clutch assembly 106 which normally is disengaged so that only the first generator 100 is driven from the wind turbine assembly 10. The electric clutch 106 is activated in response to the governor assembly 14 so that when the rotational speed of the wind turbine assembly reaches a predetermined rpm, the governor assembly will activate the clutch 106 thus cutting in the second generator 102 to increase the load on the wind turbine assembly thereby slowing it down so that it will not exceed a critical rotational speed. If desired, multiple generators may be employed with progressive electric clutch devices or mechanical centrifugal type clutch devices may be provided for progressively adding on generators to the load or removing generators from the load in response to the rotational speed of the wind turbine shaft 22.

FIG. 3 illustrates the details of the governor assembly which includes a vertical shaft 108 journalled from a bearing assembly 110 rigid with an upstanding post or supporting member 112 that is fixed rigidly to the turntable 26. The lower end of the shaft 108 is provided with a bevel gear 114 in meshing engagement with a bevel gear 116 fixed to the shaft 22 for rotation therewith. The upper end of the shaft 108 is provided with a swing arm 118 that is pivotally connected to the upper end of the shaft 108 for pivotal movement about a transverse pin 120. The free end of the arm 118 is provided with a ball or weight 122 thereon which normally causes the arm 118 to be oriented in a downwardly inclined direction as illustrated in FIG. 3. When the rotational speed of the shaft 108 increases, the arm 118 will swing upwardly toward a horizontal position as illustrated in broken line in FIG. 3 and when it reaches a predetermined rotational speed, the movement of the arm 118 and the weight 122 on the end thereof will be such that the weight 122 will come into contact with a switch button 124 carried by a support arm 126 which is also rigid with the supporting member 112. The contact switch 124 may be any suitable type which will actuate the electric clutch 106 when contacted by the arm or weight 122 with the switch 124 being held in closed position as long as the weight 122 contacts it during each revolution but when the weight 122 fails to contact the switch 124 due to the speed of rotation of the shaft 108 slowing down, then the contact 124 will disengage the clutch 106 thus taking the second generator 102 off the line. Also connected with the support member 112 is a wind vane or rudder 130 which parallels the shaft 22 and serves to maintain the shaft 22 in parallel relation to the wind direction. The shape and size of the rudder 130 may be varied to maintain the turntable 26 and the turbine assembly 10 in stationary position insofar as any reaction force exerted thereon due to rotation of the shaft 80 and also maintain the shaft 22 parallel to the path of movement of the air or wind passing through the wind wheels 34.

With this construction, the orientation of the wind wheels outwardly of the turntable enables the size and shape of the wind wheels to be varied as well as the number of wind wheels to be varied to produce the desired power depending upon the normal wind encountered in various locations. The wind rudder serves to maintain the wind wheels properly oriented for axial flow of wind through the wind wheels and the governor prevents over-speeding of the wind wheels by cutting in additional generators or additional loads on the output shaft. The turntable and supporting plate structure provides a rigid support for the turntable but yet enables rotation of the turntable with a minimum of friction thereby providing a stable and long lasting structure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wind turbine assembly comprising a supporting framework including a rigid elevated platform, a turntable rotatably supported from said platform for swivelling movement about a substantially vertical axis, a horizontal shaft rotatably journalled from the turntable with the end portions of the shaft projecting diametrically therefrom, a plurality of wind wheels mounted on each end of the horizontal shaft outwardly of the turntable for rotating the shaft in response to axial flow of wind through the wind wheels, the area peripherally of said wind wheels being unconfined to provide unrestricted and untrapped wind flow in relation to the wind wheels, a vertical shaft supported from the framework and drivingly connected to the horizontal shaft, a generator assembly supported at the lower end of the framework and being drivingly connected to the vertical shaft, a wind rudder connected with the turntable for maintaining the rotational axis of the horizontal shaft generally parallel to the wind direction, and governor means driven from the horizontal shaft for increasing the load on the vertical drive shaft by the generator assembly in response to the rotational speed of the horizontal shaft above a predetermined rpm for preventing over-speeding of the wind wheels.

2. The structure as defined in claim 1 wherein said governor means includes a vertically disposed shaft driven from the horizontal wind wheel shaft, a weighted arm pivotally attached to said shaft and extending radially therefrom and normally being disposed in a downwardly inclined position but capable of pivotal movement to a horizontal position in response to rotational movement of the vertical governor shaft, contact means engageable by the swinging arm when in horizontal position effective to increase the load on the vertical drive shaft when the rotational speed of the vertical governor shaft exceeds a predetermined rpm.

3. The structure as defined in claim 1 wherein said platform includes at least one annular track on the upper surface thereof with the track having an annular flange thereon, said turntable including a depending annular bracket having an annular flange thereon underlying the annular flange on the platform track, bearing means journaled on said bracket on the platform and engaging the upper surface of the annular flange on the platform track, bearing means on the annular flange on the bracket depending from the turntable engaging the undersurface of the annular flange on the platform track thereby captively and rotatably retaining the turntable on the platform, said generator assembly including a plurality of generators, said governor means including means for selectively connecting the generators to the vertical shaft for increasing the load on the vertical shaft when the horizontal shaft reaches a predetermined rotational speed, said wind rudder being disposed above the wind wheels whereby wind passing over the wind wheels will not interfere with wind passing the wind rudder.

4. A wind turbine assembly comprising a supporting framework including a rigid elevated platform, a turntable rotatably supported from said platform for swivelling movement about a substantially vertical axis, a horizontal shaft rotatably journalled from the turntable with the end portions of the shaft projecting diametrically therefrom, a plurality of wind wheels mounted on each end of the horizontal shaft for rotating the shaft in response to axial flow of wind through the wind wheels, a vertical shaft supported from the framework and drivingly connected to the horizontal shaft, a generator assembly supported at the lower end of the framework and being drivingly connected to the vertical shaft, a wind rudder connected with the turntable for maintaining the rotational axis of the horizontal shaft generally parallel to the wind direction, and governor means driven from the horizontal shaft for varying the load imparted on the vertical drive shaft by the generator assembly in response to the rotational speed of the horizontal shaft above a predetermined rpm for preventing overspeeding of the wind wheels, said governor means including a vertically disposed shaft driven from the horizontal wind wheel shaft, a weighted arm pivotally attached to said shaft and extending radially therefrom and normally being disposed in a downwardly inclined position but capable of pivotal movement to a horizontal position in response to rotational movement of the vertical governor shaft, contact means engageable by the swinging arm when in horizontal position effective to increase the load on the vertical drive shaft when the rotational speed of the vertical governor shaft exceeds a predetermined rpm, said generator assembly including a first and second generator interconnected by a drive shaft having a clutch means incorporated therein, said contact means engageable by said swinging arm controlling said clutch means for selectively connecting a second generator to the first generator when the rotational speed of the wind wheel shaft exceeds a predetermined rpm.

5. The structure as defined in claim 4 wherein said wind wheels are disposed radially outwardly of the turntable to enable variation in diameter of the wind wheels and variation in the number of wind wheels on the horizontal shaft, said wind rudder being supported rigidly from the turntable in elevated relation above the wind wheels whereby wind engaging the wind wheels is below the wind engaging the wind rudder, said wind rudder being a flat panel rigid with the turntable and of sufficient size to maintain the turntable in stable position with the axis of rotation of the horizontal shaft parallel to the path of the wind.

6. The structure as defined in claim 5 wherein said platform includes a plurality of annular, T-shaped tracks rigidly secured to the upper surface thereof, said turntable including means on the undersurface thereof engaging the tracks for rotatably securing the turntable to the platform, said means on the undersurface of the turntable including a plurality of angular brackets each of which includes opposed horizontal flanges extending in underlying relation to the T-shaped track for captively retaining the turntable in parallel relation to the platform, and bearing means engaging the top and bottom surfaces of the transverse flange on each T-shaped track for providing reduced frictional engagement to enable swivelling movement of the turntable.

\* \* \* \* \*